(12) United States Patent
Gardelle

(10) Patent No.: US 8,958,444 B2
(45) Date of Patent: *Feb. 17, 2015

(54) DEVICE AND METHOD FOR GENERATING COHERENT SMITH-PURCELL RADIATION

(71) Applicant: Commissariat a l'Energie Atomique et aux Energies Alternatives, Paris (FR)

(72) Inventor: Jacques Gardelle, Pessac (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,958

(22) Filed: Apr. 4, 2014

(65) Prior Publication Data

US 2014/0301414 A1    Oct. 9, 2014

(30) Foreign Application Priority Data

Apr. 5, 2013  (FR) ...................... 13 53086

(51) Int. Cl.
*H01S 3/00* (2006.01)
*H01S 3/09* (2006.01)

(52) U.S. Cl.
CPC .................... *H01S 3/0903* (2013.01)
USPC ......................................................... 372/2

(58) Field of Classification Search
CPC .......... H01S 3/0903; H01S 3/00; H01S 13/00
USPC ..................... 372/2, 50.11, 74; 250/396, 400; 343/786

See application file for complete search history.

(56) References Cited

U.S. PATENT DOCUMENTS

2006/0062258 A1*  3/2006  Brau et al. ........................ 372/2
2013/0083811 A1    4/2013  Gardelle

FOREIGN PATENT DOCUMENTS

FR    2980923 A1    4/2013
WO    02/25785 A2    3/2002

OTHER PUBLICATIONS

Wexin Liu et al. "Enhancements of Terahertz Radiation From a Grating Waveguide by Two-Stream Instability" IEEE Transactions on Plasma Science, IEEE Service Center. vol. 36, No. 3 dated Jun. 1, 2008.
Andrews H et al. "Three-dimensional theory of the Smith-Purcell free-electron laser with slide walls", Journal of Applied Physics. vol. 105, No. 5 dated Jan. 23, 2009.

(Continued)

*Primary Examiner* — Tuan Nguyen
(74) *Attorney, Agent, or Firm* — Pearne & Gordon LLP

(57) ABSTRACT

A device (100) for generating a coherent Smith-Purcell radiation including an electrically conducting diffraction grating (102), laterally delimited by two electrically conducting external sidewalls (104); and a source (101) for generating an electron beam (103) and for emitting it so that it passes above the diffraction grating (102). The device (100) also includes one electrically conducting intermediate wall (105), parallel to the external sidewalls (104), located inside the diffraction grating (102) to form several similar elementary diffraction gratings (1061,1062). The source (101) emits an electron beam (103) with a speed and a current density adapted such that each elementary diffraction grating (1061,1062) emits a Smith-Purcell radiation on the fundamental mode. The elementary diffraction gratings (1061,1062) interact with each other to reduce the saturation time necessary for the Smith-Purcell radiation to be produced.

8 Claims, 3 Drawing Sheets

(56) References Cited

OTHER PUBLICATIONS

Li D et al. "Reduce the start current of Smith-Purcell backward wave oscillator by sidewall grating", Applied Physics Letters, vol. 91, No. 22 dated Nov. 29, 2007.

J.T. Donohue et al. "Simulation of Smith-Purcell free-electron laser with sidewalls: Copious emission at the fundamental frequency" Applied Physics Letters, vol. 99, No. 16, dated Jan. 1, 2011.

French Search Report issued in corresponding Application No. FR 1353086 dated Oct. 28, 2013.

J.T. Donohue et al. "Dispersion relation for a three-dimensional lamellar grating", Physical Review Special Topics Accelerators and Beams, vol. 14, dated Jun. 24, 2011.

* cited by examiner

DEVICE AND METHOD FOR GENERATING COHERENT SMITH-PURCELL RADIATION

TECHNICAL FIELD

This invention relates to the field of coherent electromagnetic sources in the THz domain, and particularly coherent Smith-Purcell radiation generators.

STATE OF PRIOR ART

When an electron beam is emitted parallel to the surface of a diffraction grating, electromagnetic radiation known as Smith-Purcell radiation can be obtained.

Prior art is familiar with a method of generating very efficient Smith-Purcell radiation, making use of three-dimensional properties of a diffraction grating. Such a method is described in the article by J. T. Donohue and J. Gardelle, "*Simulation of a Smith-Purcell free-electron laser with sidewall: Copious emission at the fundamental frequency*", Applied Physics Letters 99 (2011), 161112-1, and in French patent application FR 1158907.

According to this method, an electron beam passes above an electrically conducting diffraction grating delimited laterally by two electrically conducting sidewalls.

The electron beam is initially continuous, and is modulated and separated into packets by interaction with the diffraction grating. This leads to emission of coherent electromagnetic radiation in a predetermined diffraction direction.

The characteristics of the electron beam are chosen such that:
  the speed of electrons is slow enough so that a straight line, drawn in a dispersion diagram in which the frequency (f) is expressed as a function of the wave number (k), representing the frequency of the electron beam as a function of its wave number, intersects a curve representing the dispersion relation in three dimensions corresponding to the fundamental mode of the diffraction grating in the first Brillouin zone, at a point outside an isosceles triangle, the base of which is coincident with the abscissa axis of the dispersion diagram and one side of which is a segment with slope $$\frac{c}{2\pi}$$

passing through the origin of said diagram, and in which c is the speed of light in vacuum; and
  the current density of the electron beam is sufficiently high to excite the fundamental mode of the diffraction grating, radiated towards the outside of this grating.

The electron speed will be determined as disclosed later using a dispersion diagram.

The result obtained is thus a coherent, tuneable and strongly directional electromagnetic radiation directly derived from the fundamental interaction mode between the electron beam and the diffraction grating. The efficiency obtained is about a hundred times greater than the efficiency obtained with methods for generating Smith-Purcell radiation using the second harmonic.

The saturation time is the time necessary so that, due to interaction with the diffraction grating, the electron beam at the centre of the grating reaches a stable state in which it is modulated and separated into electron packets.

Equivalently, we can refer to the time to obtain bunching of the electron beam, where bunching means bringing electrons into packets (also called bunches).

The saturation time is relatively long. For example, a saturation time of 40 ns was obtained for an electromagnetic emission at 20 GHz, an electron beam at 300 mA and a diffraction grating of 90 periods.

One purpose of this invention is to disclose a device for generating a coherent Smith-Purcell radiation, capable of reducing the saturation time of the interaction between the diffraction grating and the electron beam.

Another purpose of this invention is to propose a method of generating coherent Smith-Purcell radiation, capable of reducing this saturation time.

PRESENTATION OF THE INVENTION

This objective is achieved with a device for generating a coherent Smith-Purcell radiation comprising:
  an electrically conducting diffraction grating laterally delimited by two electrically conducting external sidewalls; and
  a source for generating an electron beam and for emitting it so that it passes above the diffraction grating.

According to the invention, the device also comprises at least one electrically conducting intermediate wall parallel to the external sidewalls, located inside the diffraction grating to form several similar elementary diffraction gratings laterally delimited by two sidewalls, and the source is laid out to generate an electron beam such that:
  the speed of the electrons is low enough so that a straight line, drawn in a dispersion diagram in which the frequency is expressed as a function of the wave number, representing the frequency of the electron beam as a function of its wave number, intersects a curve representing the dispersion relation in three dimensions corresponding to the fundamental mode of the elementary diffraction grating in the first Brillouin zone, at a point outside an isosceles triangle, the base of which is coincident with the abscissa axis of the dispersion diagram and one side of which is a segment with slope $$\frac{c}{2\pi}$$

passing through the origin of said diagram, in which c is the speed of light in vacuum; and
  the current density of the electron beam is sufficiently high to excite the fundamental mode of each elementary diffraction grating, radiated towards the outside of this grating.

Preferably, the width of the elementary diffraction grating between the two walls is less than 25 mm, and the width of the diffraction grating between the external sidewalls is more than 30 mm.

The invention is also applicable to a method of generating a coherent Smith-Purcell radiation in which:
  an electrically conducting diffraction grating is used, laterally delimited by two electrically conducting external sidewalls; and
  an electron beam is generated and it is emitted so that it passes above the diffraction grating.

According to this method:
  at least one electrically conducting intermediate wall is used, parallel to the external sidewalls, located inside the diffraction grating to form several similar elementary diffraction gratings laterally delimited by two sidewalls;

the speed of the electrons is low enough so that a straight line, drawn in a dispersion diagram in which the frequency is expressed as a function of the wave number, representing the frequency of the electron beam as a function of its wave number, intersects a curve representing the dispersion relation in three dimensions corresponding to the fundamental mode of the elementary diffraction grating in the first Brillouin zone, at a point outside an isosceles triangle, the base of which is coincident with the abscissa axis of the dispersion diagram and one side of which is a segment with slope $$\frac{c}{2\pi}$$

passing through the origin of said diagram, in which c is the speed of light in vacuum; and the current density of the electron beam is sufficiently high to excite the fundamental mode of each elementary diffraction grating, radiated towards the outside of this grating.

Preferably, the electron beam is emitted so that it passes at a distance of less than 1 millimeter from the diffraction grating.

A flat electron beam can advantageously be generated with a width slightly less than the distance separating the external sidewalls of the diffraction grating.

A flat electron beam with a width of more than 30 millimeters can be generated.

BRIEF DESCRIPTION OF THE DRAWINGS

This invention will be better understood after reading the description of example embodiments given purely for information and non-limitatively with reference to the appended drawings among which.

DETAILED PRESENTATION OF PARTICULAR EMBODIMENTS

Figure 1:
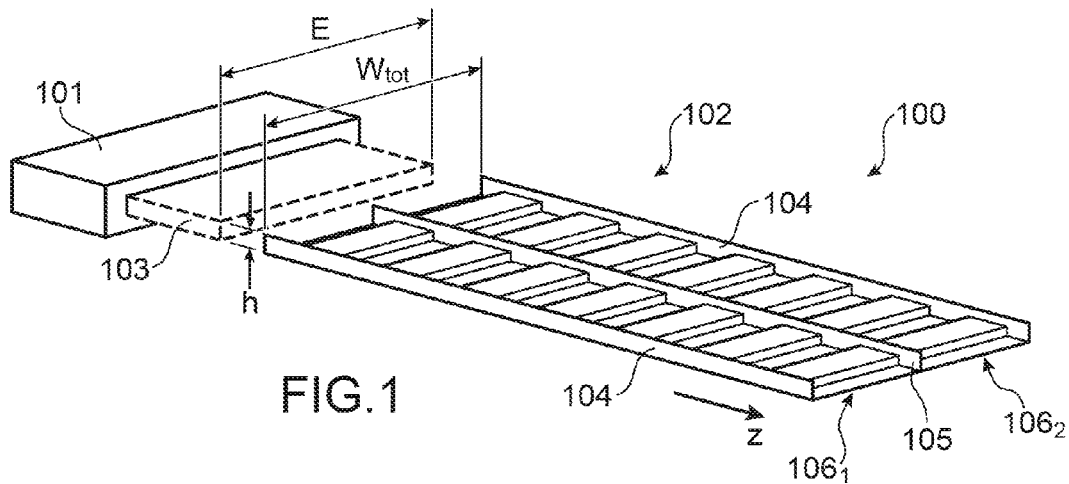
FIG. 1 shows a first embodiment of a device according to one embodiment of the invention, seen in perspective.

We will start by describing a first example of a device 100 according to the invention to generate coherent Smith-Purcell radiation, with reference to FIG. 1.

This device 100 comprises a source 101 and a diffraction grating 102.

The source 101 is arranged to generate an electron beam 103 and to emit it so that it passes above the diffraction grating 102, between two external sidewalls 104 of the diffraction grating delimiting the diffraction grating on the sides. The source is typically an electron gun of the type used in conventional microwave tubes.

The electron beam 103 is shown in dashed lines, and before the beam reaches the diffraction grating 102. The electron beam has a width E and a height h equal to about 1 mm that define a rectangular profile in a plane orthogonal to a beam propagation axis denoted z.

The electrons in the beam typically have a kinetic energy of between 20 keV and 150 keV (where 1 eV=1.60217653× $10^{-19}$ J). The kinetic energy T and the speed v of the electrons are related by the relation T=$(\gamma-1)mc^2$, in which m is the mass of the electron, c is the speed of light in vacuum, $\gamma=(1-\beta^2)^{1/2}$, where $\beta$ is the ratio between the speed v of the electrons and the speed c of light in vacuum.

The electron beam current is at least 1 A. For example, it may be between 1 A and 500 A.

The electron beam 103 is guided by an external magnetic field (not shown).

The propagation axis z corresponds to the longitudinal axis of the diffraction grating 102.

The diffraction grating 102 is made from an electrically conducting material, for example made of metal. It is delimited on the sides by two external sidewalls 104 extending along the z axis. The external sidewalls are also made from an electrically conducting material, for example made of metal.

The width E of the electron beam is slightly less than a distance $W_{tot}$ separating the external sidewalls 104.

The diffraction grating 102 has a series of grooves with a rectangular profile, parallel to each other. This is a referred to as a lamellar grating.

Other types of profiles could be envisaged, for example triangular or sinusoidal, without going outside the scope of this invention.

The device 100 according to the invention also comprises at least one intermediate wall. A number n of intermediate walls divides the diffraction grating into (n+1) elementary diffraction gratings. For example, there may be 4 elementary diffraction gratings or 8 elementary diffraction gratings. Each intermediate wall is advantageously made from the same material and has the same dimensions as the external sidewalls 104. Each intermediate wall is parallel to the external sidewalls 104 and is inserted in the diffraction grating 102 to form similar elementary diffraction gratings. The grooves of the diffraction grating 102 are intersected by each intermediate wall. It can be considered that the diffraction grating 102 is open along the direction of its length, so that an intermediate wall can be inserted in it.

In the example shown in FIG. 1, there is a single intermediate wall 105 that divides the diffraction grating 102 into two similar elementary diffraction gratings $106_1$, $106_2$.

It is said that the elementary diffraction gratings $106_1$, $106_2$ are similar because they have the same grooves, and the distance between the walls that delimit them is the same. Depending on the case, the walls that delimit them may be an external sidewall 104 and an intermediate wall 105, or two intermediate walls.

Therefore the elementary diffraction gratings $106_1$, $106_2$ have the same dispersion relation in three dimensions corresponding to the fundamental mode.

Coherent Smith-Purcell radiation is generated by interaction between the electron beam 103 and the diffraction grating 102. The electron beam 103 has particular properties for this purpose that will be described in detail later.

Figure 2:
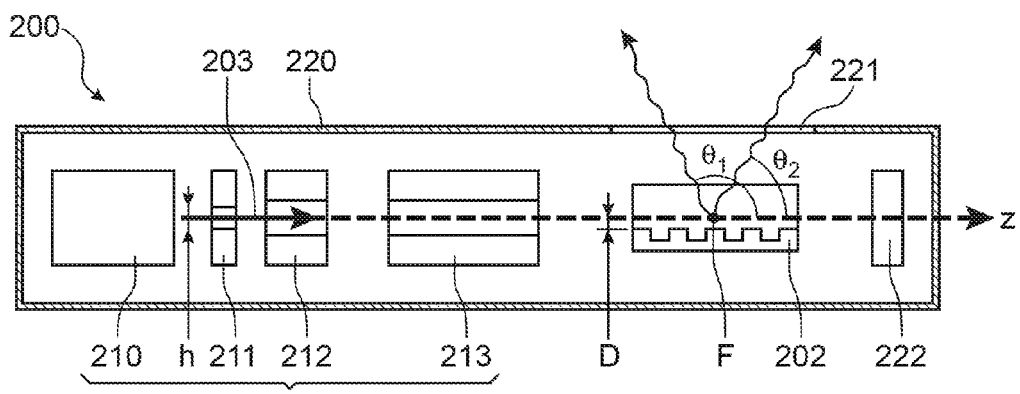
FIG. 2 shows a second embodiment of a device according to the invention, seen in a sectional view.

We will now describe a second embodiment of the device 200 according to the invention, seen in a sectional view in FIG. 2.

In this embodiment, the source 201 comprises the following in sequence one after the other:
- an electron gun 210 producing an electron beam 203.
- a rectangular slit 211 with a height h very much less than its width, placed orthogonal to the z axis to give the required shape to the electron beam 203.
- optional focusing means 212 so that the electron beam 203 can be focused along a line parallel to the grooves in the diffraction grating 202 if need be, above a central zone of the diffraction grating. In the sectional view, said line corresponds to point F. These focusing means 212 may include an electrostatic lens.
- optional guidance means 213 to guide the electron beam along the z axis if need be. These guidance means 213 may include a magnetic guidance unit. The focusing means 212 and the guidance means 213 may be made with the same axial magnetic field, produced by a permanent magnet or an electromagnet.

The diffraction grating 202 is identical to the grating 102 in FIG. 1.

The diffraction grating 202 and the source 201 are placed in a vacuum chamber 220 inside which the pressure is of the order of $10^{-5}$ mbars to $10^{-4}$ mbars (where $10^5$ Pa=1 bar=1000 mbars).

A window 221 arranged above the grating allows Smith-Purcell radiation to pass through it.

Stop means 222 are also shown to stop the electron beam 203.

FIG. 2 also shows the distance D between the electron beam 203 and the diffraction grating 202. This distance is measured between the highest point of the diffraction grating and the lowest point of the electron beam.

Since FIG. 2 is a sectional view, the external sidewalls and the intermediate wall are not shown.

FIG. 2 also shows directive Smith-Purcell emissions along the $\theta_1$ and $\theta_2$ angular directions. Further details about these angles will be given with reference to FIG. 5.

Figure 3:
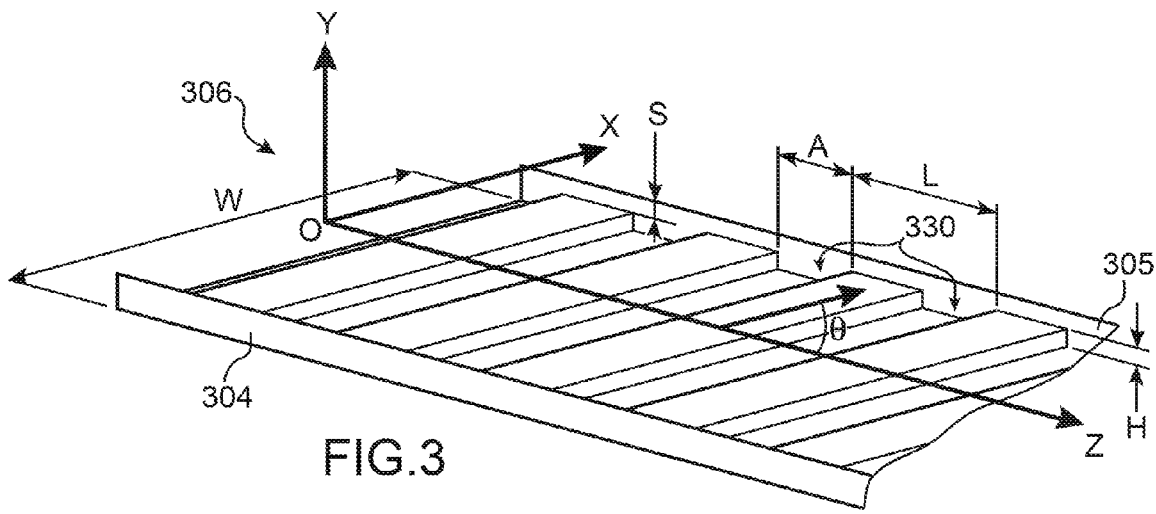
FIG. 3 shows a detail of a diffraction grating as represented in FIG. 1, seen in perspective.

FIG. 3 shows a detailed perspective view of a diffraction grating according to the invention. FIG. 3 defines a series of parameters used in the following description.

FIG. 3 shows a detail of an elementary diffraction grating 306 delimited by an external sidewall 304 and an intermediate wall 305. The elementary diffraction grating 306 is the same as the elementary diffraction grating $106_1$ or $106_2$ in FIG. 1.

The elementary diffraction grating has:
- several grooves 330;
- a width W, between the walls delimiting the elementary diffraction grating 306;
- a period L, or pitch of the diffraction grating corresponding to the elementary pattern of the grating. The number of periods of the grating is denoted N.
- a groove thickness A;
- a groove height H;
- a wall height S, defined from the highest point of the diffraction grating;
- an angle θ defining a direction of a radiation emitted by the diffraction grating.

The grooves extend along an axis denoted x. The x axis defines a plane with the propagation axis z. A third axis denoted y defines a direct orthogonal coordinate system (Oxyz).

Preferably, L<W<5L.

The wavelength of the Smith-Purcell radiation in vacuum, emitted at an angle θ relative to the electron beam, may be determined approximately from a two-dimensional model of the grating (in the (Oyz) plane):

$$\lambda = \frac{c}{f_{2D}} = \frac{L\left(\frac{1}{\beta} - \cos\theta\right)}{|n|}, \text{ where} \quad (1)$$

$f_{2D}$ is the frequency of this radiation assuming that the width of the diffraction grating is infinite, β is the ratio between the electron speed v and the speed c of light in vacuum, n is the diffraction order, where n=−1 in the case of an emission on the fundamental mode according to the invention, and L is the period of the diffraction grating.

If it is assumed that the width of the grating is no longer infinite but is equal to a finite width W (3D model of the grating), the previous relation has to be corrected to take account of transverse modes (boundary conditions on the conducting walls).

In this case, the Smith-Purcell radiation frequency is given as follows:

$$f_{3D} = \sqrt{f_{2D}^2 + \left(\frac{\alpha c}{W}\right)^2}, \quad (2)$$

in which α is equal to integer or semi integer values and $f_{3D}$ is the frequency of Smith-Purcell radiation in a diffraction grating delimited by walls spaced by a distance W.

Figure 4:
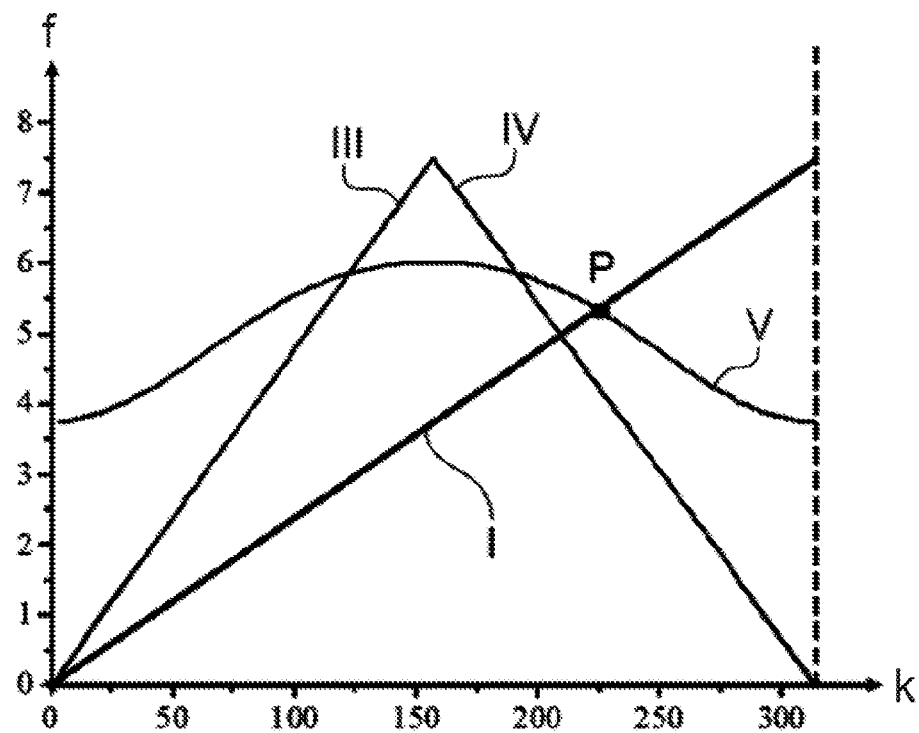
FIG. 4 shows a dispersion diagram for illustrating the operating point according to the invention.

FIG. 4 shows a dispersion diagram to obtain the operating point of a Smith-Purcell radiation generator according to the invention.

FIG. 4 shows the frequency f in GHz as a function of the wave number k in $m^{-1}$. We will restrict the description to an interval of wave number k between 0 and $$K = \frac{2\pi}{L},$$

corresponding to what is called the first Brillouin zone of the grating.

FIG. 4 shows:

a straight line with equation $$f = \frac{v}{2\pi} * k,$$

where v is the speed or electrons in the electron beam. This straight line is called the "electron line". This straight line is denoted I.

a straight line III called the "forward light line", with equation $$f = \frac{c}{2\pi} * k,$$

where c is the speed of the light in vacuum;

a straight line IV called the "backward light line".

Straight lines III and IV, and the abscissa axis define what is called a "light triangle".

This light triangle can be defined as being a isosceles triangle, the base of which is coincident with the abscissa axis of the dispersion diagram and one side of which is a segment with a slope $$\frac{c}{2\pi}$$

passing through the origin or said diagram.

For example if L=2 cm:

the equation of straight line III is $$f = \frac{c}{2\pi} * k,$$

k≤50π; and the equation of straight line IV is $$f = \frac{c}{2\pi} * (100\pi - k),$$

50π≤k≤100π.

Curve V represents the three-dimensional dispersion relation of an elementary diffraction grating according to the invention, corresponding to the fundamental mode. Those skilled in the art will easily be able to determine this dispersion relation. For example, they can refer to the document by J. T Donohue and J. Gardelle, "*Dispersion Relation for a Three-Dimensional Laminar Grating*", Phys. Rev. ST Accel. Beams 14, 060709 (2011).

The electron speed is chosen such that straight line I intersects curve V at a point P located outside the light triangle, which enables a coherent Smith-Purcell emission on the fundamental mode.

The source according to the invention thus emits an electron beam with a speed and a current density chosen such that each elementary diffraction grating emits a Smith-Purcell radiation on the fundamental mode.

Figure 5:
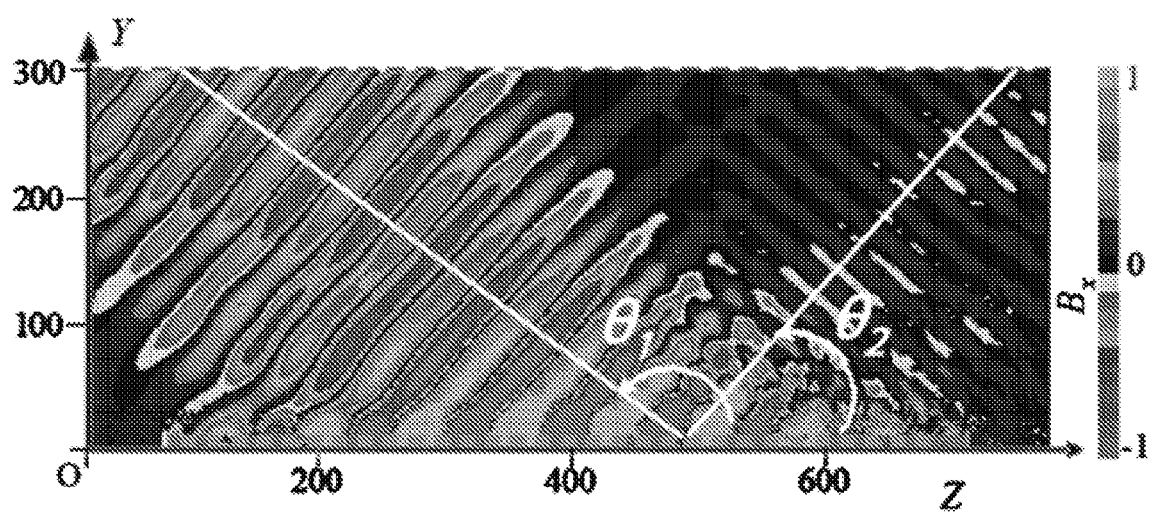
FIG. 5 shows an example of electromagnetic radiation obtained with a device according to the invention.

FIG. 5 shows an example of the electromagnetic radiation obtained above a device according to the invention.

In particular, FIG. 5 shows the component along the x axis of the electromagnetic field, at a given moment, in a section in the (yOz) plane. Distances Y and Z are expressed in mm. The component along x of the electromagnetic field (magnetic field) is denoted $B_x$. It is expressed in Gauss (1G corresponds to $10^{-4}$ T or to a power density of 120 W/cm²), and it is shown in FIG. 5 by a grey intensity that depends on the value of the magnetic field.

The lobe emitted backwards, at an angle $\theta_1$ not very different from 150°, corresponds to a wave with the fundamental frequency. The radiation of the second harmonic emitted forwards at an angle $\theta_2$ very close to 50°, can also be seen.

Figure 6:
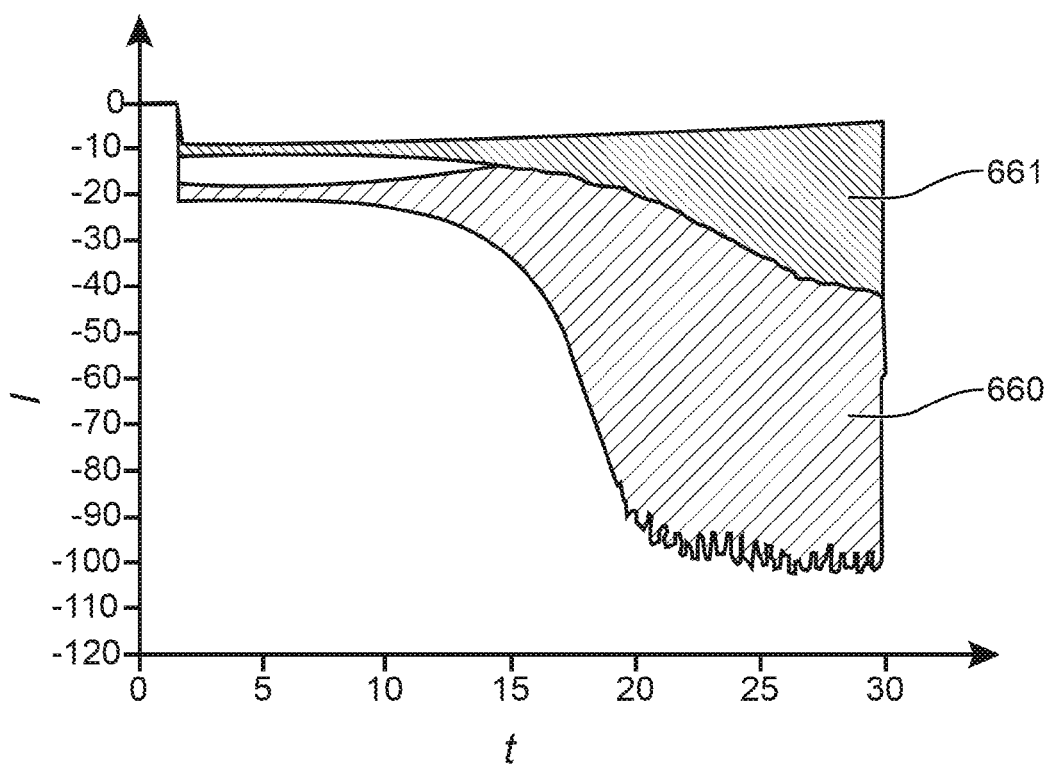
FIG. 6 shows the variation of the electron current in a device according to the invention and according to prior art, as a function of time.

FIG. 6 shows the variation of the electron current (expressed in A) as a function of time (expressed in ns) in a diffraction grating of a device according to the invention and according to prior art. This is a three-dimensional digital simulation made using a PIC (Particle-in-cell) code commercially available under the name "MAGIC 3D".

The devices used have the following characteristics:

| | Device according to prior art (without an intermediate wall) | Device according to the invention (with an intermediate wall) |
|---|---|---|
| Number of periods N | 20 | 20 |
| Period L | 2 cm | 2 cm |
| Groove depth H | 1 cm | 1 cm |
| Groove thickness A | 1 cm | 1 cm |
| Total grating width $W_{tot}$ | 4 cm | 8 cm |
| Height of walls S | 2 cm | 2 cm |
| Beam energy | 80 keV | 80 keV |
| Beam intensity | 10 A | 20 A |
| Beam thickness | 1 mm | 1 mm |
| Beam-grating distance D | 1 mm | 1 mm |
| Beam width | 35 mm | 70 mm |

Therefore, it can be seen that the device according to the invention is then equivalent to two devices according to prior art, adjacent to each other along a sidewall.

This means that:

in theory, the device according to the invention and the device according to prior art have the same Smith-Purcell radiation frequency on the fundamental mode; and the electron beam in the device according to the invention is twice as wide and has a current twice as high (to maintain the same current density) as the electron beam in the device according to prior art.

The following results are obtained:

| | Device according to prior art (without an intermediate wall) | Device according to the invention (with an intermediate wall) |
|---|---|---|
| Power available in the beam | 800 kW | 1600 kW |
| Power lost by the beam | 100 kW | 200 kW |
| Power radiated on the fundamental mode | 50 kW | 170 kW |
| Efficiency on the fundamental mode | 6.25% | 10.6% |

It can be seen that the device according to the invention can improve the efficiency on the fundamental mode for an elementary diffraction grating exactly the same as the grating in prior art.

In FIG. 6, zone 660 shows the current at the centre of an elementary diffraction grating in the device according to the invention. Zone 661 shows the current at the centre of the diffraction grating in the device according to prior art.

It is quite clear that the current in prior art is initially DC. As time continues, this DC current is transformed into high amplitude sinusoidal currents at different harmonics of the fundamental frequency. A Smith-Purcell radiation is emitted once the current is sufficiently modulated. This emission takes place after a saturation time of more than 30 ns.

With the invention, the same saturation phenomenon is observed but it occurs after a much shorter duration of about 20 ns. After 20 ns, the amplitude of current oscillations reaches a maximum of about 100 A, and a Smith-Purcell radiation is emitted on the fundamental mode.

Therefore, it can be seen that the device according to the invention can reduce the time necessary to reach saturation of the interaction between the diffraction grating and the electron beam.

Figure 7:
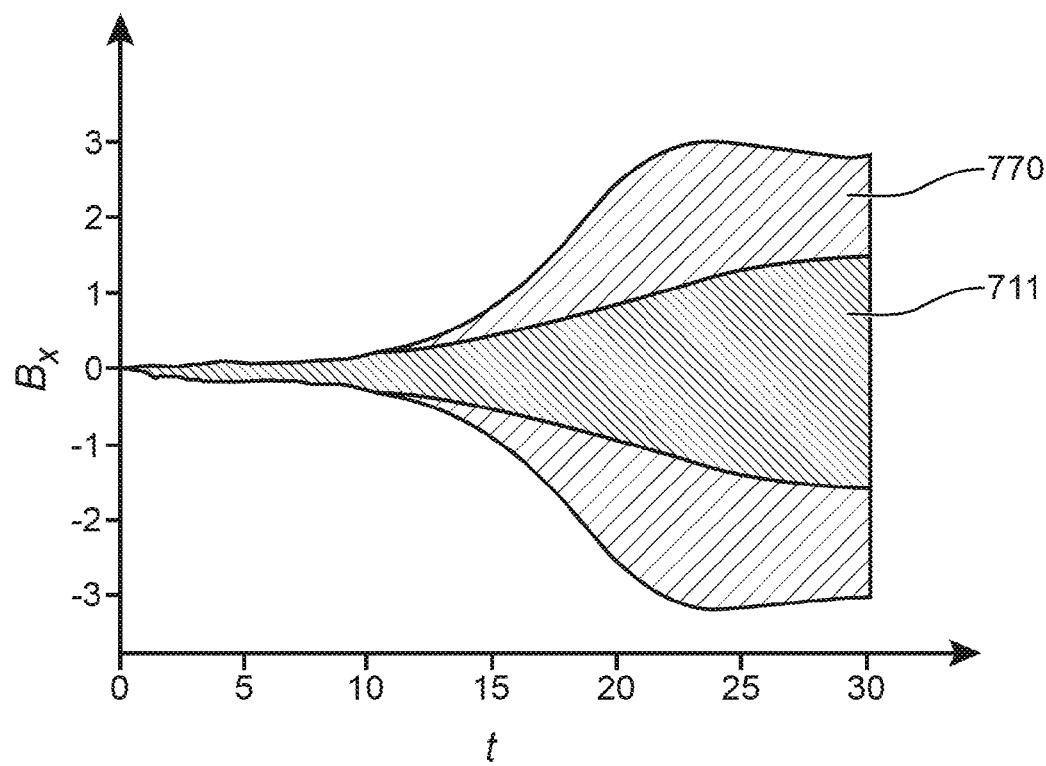
FIG. 7 shows the variation of the magnetic field radiated by a device according to the invention and by a device according to prior art, as a function of time.

FIG. 7 shows the variation of the magnetic field $B_x$ (expressed in G) radiated above a device according to the invention and according to prior art, as a function of time (expressed in ns). The same conditions as in FIG. 6 are adopted. This is also a digital simulation performed using the "MAGIC 3D" program. The field $B_x$ is measured 20 cm above the gratings, at the location at which the Smith-Purcell radiation is expected (see FIG. 5).

The measured magnetic field $B_x$ corresponds to one of the components of the Smith Purcell electromagnetic radiation in the radiated fundamental mode.

In FIG. 7, zone 770 shows the magnetic field above the device according to the invention. Zone 771 shows the magnetic field above the device according to prior art.

Once again, it can be seen that the saturation phenomenon occurs after about 20 ns in the device according to the invention, while this time is more than 30 ns in the device according to prior art.

Therefore, it is seen that the elementary diffraction gratings of the device according to the invention interact with each other so that the saturation time is less than it is with a device according to prior art that emits at approximately the same frequency.

In practice, a slight offset has been observed between the emission frequency of the device according to prior art and the emission frequency of the device according to the invention. This frequency is 5.27 GHz for the former and 5.38 GHz for the latter.

We will now describe details of another advantage of the invention.

The Smith-Purcell radiation frequency in the fundamental mode is inversely proportional to the period of the grating (see equation (1)).

In fact, increasing the Smith-Purcell radiation emission frequency requires perfect homothety (or similarity) of the geometry of the diffraction grating provided with its sidewalls.

In particular, the period L of the diffraction grating, the height H of the groove, the thickness A of the groove, the distance between the sidewalls, and the wall height are adjusted.

In prior art, the width of the electron beam has to be adjusted to the distance between the walls that delimit the diffraction grating.

In practice, it is difficult to make an electron beam sufficiently narrow and with a sufficiently intense current density to obtain Smith-Purcell radiation at the required frequency. For example, it is difficult to make an electron beam narrower than 30 mm and sufficiently intense to obtain a Smith-Purcell radiation.

However, the invention allows the use of a wide electron beam, even to obtain a high Smith-Purcell radiation frequency. The emission frequency is determined by the dimensions of the elementary diffraction grating, while the width of the electron beam is determined by the total width of the diffraction grating. The radiation produced is the sum of the radiations produced by the elementary diffraction gratings, but the interaction starts more quickly (shorter saturation time, as seen above).

Thus, compact and high efficiency electromagnetic radiation sources can be made capable of emitting a coherent electromagnetic wave in the low frequency part of the THz range, for example between 100 GHz and 300 GHz. Such sources can be useful in imagery, for example for the detection of persons carrying weapons, detection of dangerous products by spectral analysis, or detection of defects in materials.

For example, the following simulation was adopted:

|  | Device according to prior art (without an intermediate wall) | Device according to the invention (with three intermediate walls) |
| --- | --- | --- |
| Period L | 20 mm | 5 mm |
| Groove depth H | 10 mm | 2.5 mm |
| Groove thickness A | 10 mm | 2.5 mm |
| Height of walls S | 20 mm | 5 mm |
| Beam energy | 80 keV | 80 keV |
| Beam intensity | 10 A | 35 A |
| Beam thickness | 1 mm | 1 mm |
| Beam width | 35 mm | 35 mm |

Therefore, it can be seen that there is a ratio of 4 between the dimensions of the diffraction grating according to prior art and the dimensions of an elementary diffraction grating in the device according to the invention, although the dimensions of the electron beam are the same.

The total width of the diffraction grating is unchanged, but in the device according to the invention it corresponds to the sum of the widths of four elementary diffraction gratings, each 10 mm wide.

The elementary diffraction grating of the device according to the invention corresponds to the diffraction grating of the device according to prior art to which a similarity factor (homothety factor) of ¼ has been applied.

This same similarity factor of ¼ is applied to the distance D between the diffraction grating and the electron beam. Therefore, the electron beam passes along the diffraction grating at a distance of 0 mm (in practice for example 250 μm), while in the device according to prior art, the electron beam passes 1 mm away from the diffraction grating.

The distance D is typically less than $$\frac{\gamma\beta\lambda}{2\pi},$$

where β is the ratio between the speed v of electrons and the speed c of light in vacuum, λ is the wavelength of the Smith-Purcell radiation in the fundamental mode, and $\gamma=(1-\beta^2)^{-1/2}$.

The energy of the beam and therefore the speed of the electrons in the beam is the same in both cases. Since a simple similarity factor is applied to the diffraction grating, the same applies for curve V and straight lines III and IV in FIG. 4. Therefore, the slope of the straight line I can remain unchanged.

In theory, the current of the electron beam used in the device according to the invention must be four times higher than the current of the electron beam used in the device according to prior art, so that the current density of the electron beam is sufficient to excite the fundamental mode in each elementary diffraction grating. It is found that in practice this ratio is only 3.5 due to current losses. These current losses are due particularly to the presence of the intermediate walls and to the position of the electron beam flush with the diffraction grating.

This current loss is tolerated as long as the deposited energy does not excessively increase the temperature of the device according to the invention. This can be controlled by emitting the electron beam intermittently instead of continuously.

In the device according to the invention, the efficiency on the fundamental mode is equal to 5.7% (2800 kW available in the beam, 210 kW lost by the beam, 160 kW radiated on the fundamental mode).

Thus, Smith-Purcell radiation is obtained on the fundamental mode:
at a frequency close to 5.5 GHz for the device according to prior art; and
at a frequency close to 22 GHz for the device according to the invention.

It can be seen that the similarity ratio of ¼ described above increases the Smith-Purcell radiation on the fundamental mode by a factor of 4.

Therefore, a 4 times higher frequency is obtained with the device according to the invention than with the device according to prior art for the same electron beam width.

Different frequencies that are multiples of 5.5 GHz can be obtained for the same electron beam width, depending on the applied similarity factor.

Therefore, it can be seen that the device according to the invention can achieve higher Smith-Purcell radiation frequencies on the fundamental mode, while maintaining good efficiency due to a realistic electron beam.

It can be seen that the emission frequency can be tuned by ±3%, for a fixed period of the diffraction grating, while maintaining good energy efficiency. This is done by adjusting the energy of the electron beam.

The invention claimed is:

1. Device (100; 200) for generating a coherent Smith-Purcell radiation comprising:
an electrically conducting diffraction grating (102; 202), laterally delimited by two electrically conducting external sidewalls (104; 304);
a source (101; 201) for generating an electron beam (103; 203) and for emitting it so that it passes above the electrically conducting diffraction grating (102; 202);
at least one electrically conducting intermediate wall (105; 305), parallel to the electrically conducting external sidewalls (104; 304), located inside the electrically conducting diffraction grating (102, 202) to form several similar elementary diffraction gratings (106$_1$, 106$_2$; 306) laterally delimited by two sidewalls, wherein the source (101; 201) is laid out to generate the electron beam (103; 203) such that:
the speed of the electrons is low enough so that a straight line (l), drawn in a dispersion diagram in which the frequency (f) is expressed as a function of the wave number (k), representing the frequency of the electron beam as a function of its wave number, intersects a curve (V) representing the dispersion relation in three dimensions corresponding to a fundamental mode of the elementary diffraction grating (106$_1$, 106$_2$; 306) in the first Brillouin zone, at a point (P) outside an isosceles triangle, a base of which is coincident with the abscissa axis of the dispersion diagram and one side (III) of which is a segment with slope $$\frac{c}{2\pi}$$

passing through the origin of said dispersion diagram, in which c is the speed of light in vacuum; and
a current density of the electron beam is sufficiently high to excite the fundamental mode of each elementary diffraction grating (106$_1$, 106$_2$; 306), radiated towards the outside of the elementary diffraction grating.

2. Device (100; 200) according to claim 1, wherein a width (W) of the elementary diffraction grating (106$_1$, 106$_2$; 306) between the two walls is less than 25 mm, wherein the width of the electrically conducting diffraction grating (102; 202) between the electrically conducting external sidewalls (104; 304) is more than 30 mm.

3. Method of generating a coherent Smith-Purcell radiation in which:
an electrically conducting diffraction grating (102; 202) is used, laterally delimited by two electrically conducting external sidewalls (104; 304);
an electron beam is generated (103; 203) and is emitted so that it passes above the electrically conducting diffraction grating (102; 202);
at least one electrically conducting intermediate wall (105; 305) is used, parallel to the electrically conducting external sidewalls (104; 304), located inside the electrically conducting diffraction grating (102, 202) to form several similar elementary diffraction gratings (106$_1$, 106$_2$; 306) laterally delimited by two sidewalls;
the speed of the electrons is low enough so that a straight line (l), drawn in a dispersion diagram in which the frequency (f) is expressed as a function of the wave number (k), representing the frequency of the electron beam as a function of its wave number, intersects a curve (V) representing the dispersion relation in three dimensions corresponding to a fundamental mode of the elementary diffraction grating (106$_1$, 106$_2$; 306) in the first Brillouin zone, at a point (P) outside an isosceles triangle, a base of which is coincident with the abscissa axis of the dispersion diagram and one side (III) of which is a segment with slope $$\frac{c}{2\pi}$$

passing through the origin of said dispersion diagram, in which c is the speed of light in vacuum; and
a current density of the electron beam is sufficiently high to excite the fundamental mode of each elementary diffraction grating (106$_1$, 106$_2$; 306), radiated towards the outside of the elementary diffraction grating.

4. Method according to claim 3, wherein the electron beam (103; 203) is emitted so that it passes at a distance (D) of less than 1 millimeter from the electrically conducting diffraction grating (102; 202).

5. Method according to claim 4, wherein the electron beam is a flat electron beam (103; 203) with a width slightly less than the distance separating the electrically conducting external sidewalls (104; 304) of the electrically conducting diffraction grating (102; 202).

6. Method according to claim 5, wherein the flat electron beam (103; 203) is generated with the width being more than 30 millimeters.

7. Method according to claim 3, wherein the electron beam is a flat electron beam (103; 203) with a width slightly less than the distance separating the electrically conducting external sidewalls (104; 304) of the electrically conducting diffraction grating (102; 202).

8. Method according to claim 7, wherein the flat electron beam (103; 203) is generated with the width being more than 30 millimeters.

* * * * *

UNITED STATES PATENT AND TRADEMARK OFFICE
CERTIFICATE OF CORRECTION

PATENT NO. : 8,958,444 B2  
APPLICATION NO. : 14/244958  
DATED : February 17, 2015  
INVENTOR(S) : Jacques Gardelle Page 1 of 1

It is certified that error appears in the above-identified patent and that said Letters Patent is hereby corrected as shown below:

On the title page, under (57) ABSTRACT, line 10, please replace "(1061,1062)"
with --($106_1, 106_2$)--

On the title page, under (57) ABSTRACT, line 12, please replace "(1061,1062)"
with --($106_1, 106_2$)--

On the title page, under (57) ABSTRACT, line 14, please replace "(1061,1062)"
with --($106_1, 106_2$)--

In the specification,

Column 4, line 15, please replace "$\gamma = (1 - \beta^2)^{1/2}$"
with --$\gamma = (1 - \beta^2)^{-1/2}$--

Signed and Sealed this  
Eighteenth Day of August, 2015

Michelle K. Lee  
*Director of the United States Patent and Trademark Office*